United States Patent
Shirokoshi

(10) Patent No.: US 11,118,669 B2
(45) Date of Patent: Sep. 14, 2021

(54) STRAIN WAVE GEARING PROVIDED WITH LUBRICANT-MIXING-PREVENTION PART

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 121 days.

(21) Appl. No.: 16/633,391

(22) PCT Filed: Aug. 21, 2017

(86) PCT No.: PCT/JP2017/029830
§ 371 (c)(1),
(2) Date: Jan. 23, 2020

(87) PCT Pub. No.: WO2019/038817
PCT Pub. Date: Feb. 28, 2019

(65) Prior Publication Data
US 2020/0232549 A1    Jul. 23, 2020

(51) Int. Cl.
*F16H 49/00* (2006.01)
*F16H 1/32* (2006.01)
(Continued)

(52) U.S. Cl.
CPC ............ *F16H 49/001* (2013.01); *F16H 1/32* (2013.01); *F16C 2361/61* (2013.01);
(Continued)

(58) Field of Classification Search
CPC .................................................. F16H 49/001
(Continued)

(56) References Cited

U.S. PATENT DOCUMENTS 4,044,274 A * 8/1977 Ohm ................ F16H 49/001
                                              310/83
5,497,041 A * 3/1996 Kondoh ................ H02K 3/26
                                              310/82
(Continued)

FOREIGN PATENT DOCUMENTS

JP    H09250609 A    9/1997
JP    H09291985 A    11/1997
(Continued)

OTHER PUBLICATIONS

International Search Report (PCT/ISA/210) and translation and Written Opinion (PCT/ISA/237) dated Sep. 26, 2017, by the Japanese Patent Office as the International Searching Authority for International Application No. PCT/JP2017/029830.

*Primary Examiner* — Ha Dinh Ho
(74) *Attorney, Agent, or Firm* — Buchanan Ingersoll & Rooney PC

(57) ABSTRACT

A cup-shaped strain wave gearing has an externally toothed gear formed with a cylindrical extension portion extending from an end of an external tooth forming portion of the externally toothed gear. A space between the external peripheral surface of the cylindrical extension portion and an end face of an internally toothed gear is sealed by an oil seal. A space between an outer-side lubrication portion on the outer side of the externally toothed gear and an inner-side lubrication portion on the inner side of the externally toothed gear is blocked by a lubricant-mixing-prevention part configured from the cylindrical extension portion and the oil seal. The mixing of different types of lubricants supplied to the outer-side and inner-side lubrication portions can be effectively prevented.

2 Claims, 5 Drawing Sheets

(51) Int. Cl.
   *F16H 55/08*   (2006.01)
   *F16H 57/04*   (2010.01)
   *H02K 7/116*   (2006.01)

(52) U.S. Cl.
   CPC ...... *F16H 55/0833* (2013.01); *F16H 57/0471* (2013.01); *F16H 2049/003* (2013.01); *H02K 7/116* (2013.01)

(58) Field of Classification Search
   USPC .......................................................... 74/640
   See application file for complete search history.

(56) References Cited

U.S. PATENT DOCUMENTS

| | | | |
|---|---|---|---|
| 10,876,614 B2 * | 12/2020 | Mendel | F16C 43/06 |
| 11,002,353 B2 * | 5/2021 | Tan | F16H 49/001 |
| 2014/0047938 A1 * | 2/2014 | Horiuchi | F16C 19/55 |
| | | | 74/412 R |
| 2015/0285357 A1 | 10/2015 | Orii et al. | |

FOREIGN PATENT DOCUMENTS

| | | |
|---|---|---|
| JP | 2008164149 A | 7/2008 |
| JP | 2017096343 A | 6/2017 |
| WO | 2015037105 A1 | 3/2015 |

* cited by examiner

STRAIN WAVE GEARING PROVIDED WITH LUBRICANT-MIXING-PREVENTION PART

TECHNICAL FIELD

The present invention relates to a strain wave gearing, and more particularly relates to a strain wave gearing provided with a lubricant-mixing-prevention part for preventing the inter-mixing of a lubricant supplied to a tooth meshing portion on the outer side of an externally toothed gear and a lubricant of a different type supplied to a portion of a wave generator on the inner side of the externally toothed gear.

BACKGROUND ART

Strain wave gearings have an inner-side lubrication portion positioned on the inner side of an externally toothed gear, and an outer-side lubrication portion positioned on the outer side of an externally toothed gear. The inner-side lubrication portion includes sliding portions in the wave generator and a sliding portion between the wave generator and the internal peripheral surface of the externally toothed gear, and the outer-side lubrication portion is the tooth meshing portion between the externally toothed gear and the internally toothed gear. Optimal lubricants differ for the inner-side lubrication portion and the outer-side lubrication portion, and therefore, lubricants having respectively different lubricating properties are preferably supplied. However, the inner-side lubrication portion and the outer-side lubrication portion are located in nearby positions inside and outside the externally toothed gear, and therefore the two lubricants mix together. Accordingly, the same type of lubricant is often used in both lubrication portions, and there are problems such as reduced efficiency, and abrasion of the tooth meshing portion during a high load.

In the flat-type strain wave gearing described in Patent Document 1, a ring-shaped seal member is disposed on both sides of a cylindrical externally toothed gear, and the space between the inner-side lubrication portion and the outer-side lubrication portion is blocked to prevent mixing of different types of lubricant. In the strain wave gearing described in Patent Document 2, a seal member is disposed at an opening end of an externally toothed gear to prevent mixing of lubricants. In the strain wave gearing described in Patent Document 3, an elastic seal is sandwiched between an externally toothed gear and a secure member to prevent mixing of lubricants.

PRIOR ART DOCUMENTS

Patent Documents

Patent Document 1: JP 2017-96343 A
Patent Document 2: JP H09-291985 A
Patent Document 3: JP H09-250609 A

SUMMARY OF THE INVENTION

Problems to be Solved by the Invention

An object of the present invention is to provide a strain wave gearing provided with a lubricant-mixing-prevention part that can suppress, to a level that does not impede practical use, the inter-mixing of lubricant supplied to an inner-side lubrication portion and lubricant supplied to an outer-side lubrication portion.

Another object of the present invention is to provide a strain wave gearing provided with a lubricant-mixing-prevention part that can effectively prevent inter-mixing of the lubricant supplied to the inner-side lubrication portion and the lubricant supplied to the outer-side lubrication portion.

Means of Solving the Problems

The strain wave gearing of the present invention has a rigid internally toothed gear, a flexible externally toothed gear having a cup shape or a top hat shape, a wave generator, an inner-side lubrication portion on an inner side of the externally toothed gear, an outer-side lubrication portion on an outer side of the externally toothed gear, and a lubricant-mixing-prevention part for preventing a lubricant that lubricates the inner-side lubrication portion and a lubricant that lubricates the outer-side lubrication portion from inter-mixing. The externally toothed gear is provided with a cylindrical barrel part, a diaphragm extending radially inward or outward from one end of the cylindrical barrel part, and an open end, which is the other end of the cylindrical barrel part. The cylindrical barrel part is provided with an external tooth formation portion on which external teeth are formed, and a cylindrical extension portion between the end of the external tooth formation portion and the opening end. The internally toothed gear is disposed so as to surround the external tooth formation portion, and the wave generator is disposed on the inner side of the external tooth formation portion, flexing the external tooth formation portion into a non-circular shape to cause the externally toothed gear to partially mesh with internally toothed gear. The inner-side lubrication portion includes sliding portions in the wave generator and the contact portion between the wave generator and the internal peripheral surface of the externally toothed gear. The outer-side lubrication portion is the tooth meshing portion between the externally toothed gear and the internally toothed gear. The cylindrical extension portion functions as the lubrication-mixing-prevention part.

According to the present invention, in the externally toothed gear having the profile of a cup or top hat, the end of the external tooth formation portion is extended to form the cylindrical extension portion. The distance from the outer-side lubrication portion (tooth meshing portion) on the outer side of the externally toothed gear to the inner-side lubrication portion on the inner side of the externally toothed gear is increased by the length of the cylindrical extension portion. Appropriately setting the length of the cylindrical extension portion in accordance with, inter alia, the viscosity of the supplied lubricant makes it possible to suppress mixing of the two lubricants to a level that does not impede practical use. Mixing of lubricants can be suppressed without attaching a seal member or other components.

In order to effectively prevent the lubricants from mixing together, the space between the inner-side lubrication portion and the outer-side lubrication portion can be sealed using an oil seal. The oil seal can be directly secured to the internally toothed gear, or can be secured to a member secured to the internally toothed gear. Moreover, in the externally toothed gear, the external peripheral surface or the internal peripheral surface of the cylindrical extension portion can be the site where the seal lip of the oil seal is allowed to be brought into contact.

In lieu of an oil seal, it is possible to form a labyrinth seal between the cylindrical extension portion and a facing member that faces the cylindrical extension portion to prevent lubricant from circulating between the inner-side lubrication portion and the outer-side lubrication portion.

The present invention can similarly be applied to a flat-type strain wave gearing. In such instances, it is possible to form a cylindrical extension portion at both ends of the cylindrical externally toothed gear, the cylindrical extension portion making it difficult for lubricant to circulate between the inner-side lubrication portion and the outer-side lubrication portion.

It is also possible to prevent lubricant from circulating between the inner-side lubrication portion and the outer-side lubrication portion by using an oil seal or a labyrinth seal.

Furthermore, in a flat-type strain wave gearing, there are cases in which the portion of the internal peripheral surface that can be in contact with the seal lip of the oil seal can be ensured on both sides of the wave generator in the externally toothed gear. In such cases, the cylindrical extension portion can be omitted.

MODE FOR CARRYING OUT THE INVENTION

Embodiments of the present invention are described below with reference to the drawings. Following are embodiments of the present invention applied to a lubricating structure of a cup-type or flat-type strain wave gearing. The present invention can be applied to a top-hat-type strain wave gearing in similar fashion to the case of a cup-type strain wave gearing.

First Embodiment

Figure 1:
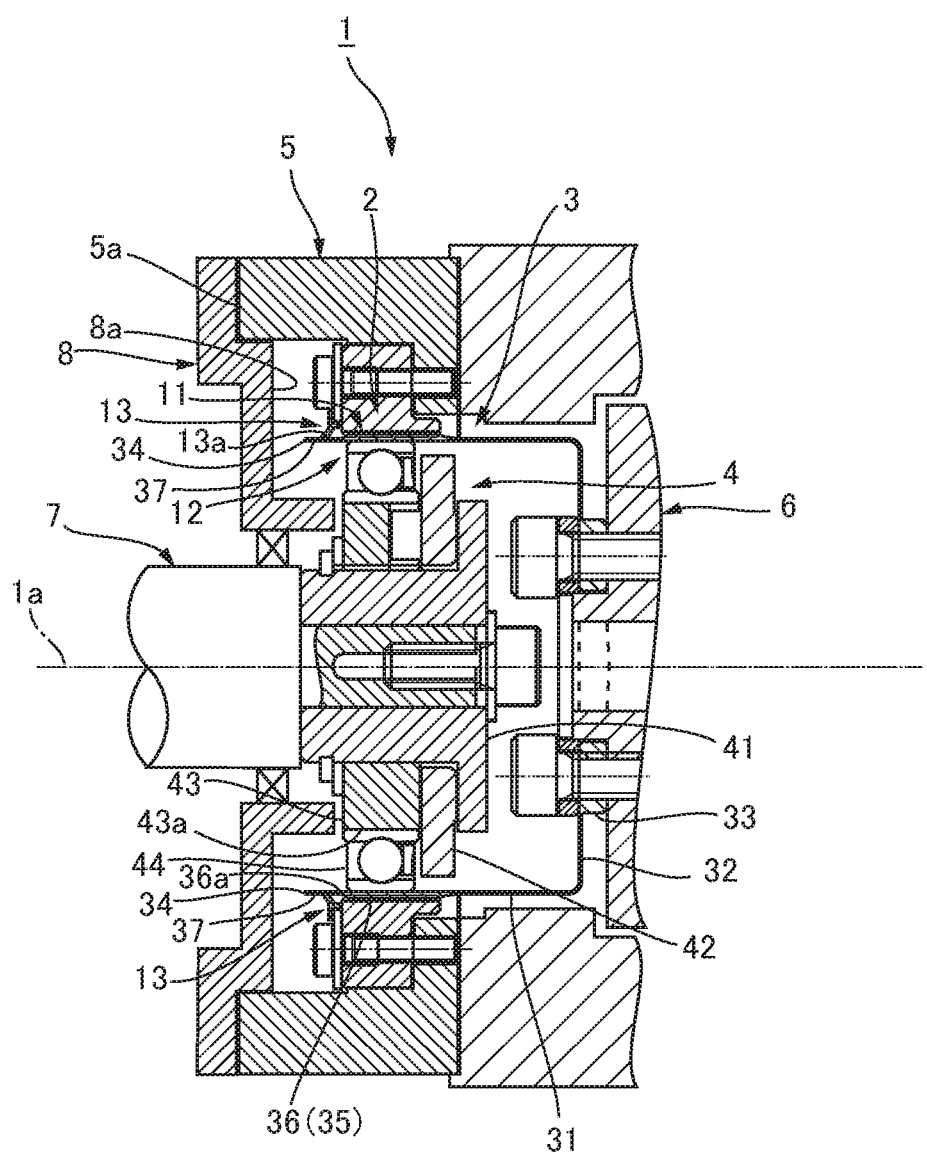
FIG. 1 is a schematic cross-sectional view of a cup-type strain wave gearing according to the first embodiment of the present invention.

FIG. 1 is a schematic cross-sectional view of a cup-type strain wave gearing according to a first embodiment of the present invention. The strain wave gearing 1 is provided with a rigid internally toothed gear 2 having an annular shape, a flexible externally toothed gear 3 having the profile of a cup disposed on the inner side of the internally toothed gear 2, and a wave generator 4 disposed on the inner side of the externally toothed gear 3. The internally toothed gear 2 is coaxially secured to the internal peripheral portion of a cylindrical device housing 5.

The externally toothed gear 3 is provided with a cylindrical barrel part 31, a diaphragm 32 extending radially inward from one end of the cylindrical barrel part 31, and a rigid annular boss 33 formed in continuous fashion on the internal peripheral edge of the diaphragm. The externally toothed gear 3 has an external tooth formation portion 36, on which are formed external teeth 35, formed on the cylindrical barrel part 31, on the side nearer to an open end 34, which is the other end of the cylindrical barrel part 31. In the cylindrical barrel part 31, the area from an end 36a of the external tooth formation portion 36 to the open end 34 constitutes a cylindrical extension portion 37 in which external teeth are not formed. The internally toothed gear 2 is disposed so as to surround the external tooth formation portion 36. The wave generator 4 is disposed on the inner side of the external tooth formation portion 36. A discoid output shaft 6 is coupled and secured to the boss 33 of the externally toothed gear 3.

The wave generator 4 is provided with a cylindrical hub 41, a rigid cam plate 43 coaxially attached to the external peripheral surface of the hub 41 via an Oldham coupling mechanism 42, and a wave bearing 44. The wave bearing 44 is mounted between the internal peripheral surface of the external tooth formation portion 36 of the externally toothed gear 3 and an ellipsoidal external peripheral surface 43a of the rigid cam plate 43. The external tooth formation portion 36 is ellipsoidally flexed by the wave generator 4. The externally toothed gear 3 thereby meshes with the internally toothed gear 2 at both ends of a long axis of an ellipsoid. A rotating motor-shaft or other rotation input shaft 7 is coaxially coupled and secured to the hub 41.

When the wave generator 4 is rotated by the rotation input shaft 7, the meshing position of both gears 2, 3 moves in the circumferential direction, and relative rotation is generated between both gears 2, 3 in correspondence to the difference in the number of teeth between both gears. In the present example, the internally toothed gear 2 is secured, and a reduced rotation is outputted from the externally toothed gear 3 via the output shaft 6.

A partitioning plate 8 for partitioning off the motor and other components on the rotation input side is secured to an end face 5a of the device housing 5. The partitioning plate 8 is provided with a facing surface 8a that faces the open end 34 of the externally toothed gear 3, and the space between the internal peripheral surface of the partitioning plate 8 and the rotation input shaft 7 is sealed by a seal member.

In the strain wave gearing 1, the tooth meshing portion of the teeth of the externally toothed gear 3 and the internally toothed gear 2 positioned on the outer side of the externally toothed gear 3 is an outer-side lubrication portion 11 which is lubricated by a lubricant. The sliding portions in the wave generator 4 positioned on the inner side of the externally toothed gear 3, and the contact portion between the wave generator 4 and the externally toothed gear 3, are the inner-side lubrication portion 12 which is lubricated by a lubricant of a type different from the lubricant supplied to the tooth meshing portion. The strain wave gearing 1 is provided with a lubricant-mixing-prevention part for preventing the lubricant supplied to the outer-side lubrication portion 11 and the lubricant supplied to the inner-side lubrication portion 12 from inter-mixing. The lubricant-mixing-prevention part of the present example is configured from the cylindrical extension portion 37 formed on the externally toothed gear 3, and an annular oil seal 13.

The cylindrical extension portion 37 is a portion from an end 36a to the open end 34 in the tooth-trace direction of the external teeth in the external tooth formation portion 36 of the externally toothed gear 3. The oil seal 13 is secured to a portion on the internal peripheral edge side of the internally toothed gear 2. A seal lip 13a of the oil seal 13 is in contact with the external peripheral surface of the cylindrical extension portion 37. The area between the outer-side lubrication portion 11 and the inner-side lubrication portion 12 is sealed by the oil seal 13. The oil seal 13 is provided with deformability capable of following deformation of the cylindrical extension portion 37 of the externally toothed gear 3, and each portion in the circumferential direction is constantly kept in a state of contact with the cylindrical extension portion 37.

The lubricant supplied to the outer-side lubrication portion 11 is blocked by the oil seal 13 from flowing out to the open end 34 side. The lubricant supplied to the inner-side lubrication portion 12 flows out to the external peripheral side of the externally toothed gear 3 by way of a gap portion between the cylindrical extension portion 37 and the partitioning plate 8. Outflow to the external peripheral side of the externally toothed gear 3 is suppressed by the cylindrical extension portion 37. Lubricant that has flowed out to the external peripheral side is blocked by the oil seal 13 from flowing into the outer-side lubrication portion 11. The two lubricants can be reliably prevented from mixing together, and both the outer-side lubrication portion 11 and the inner-side lubrication portion 12 can be kept in an appropriately lubricated state.

Modification 1-1

Figure 2A:
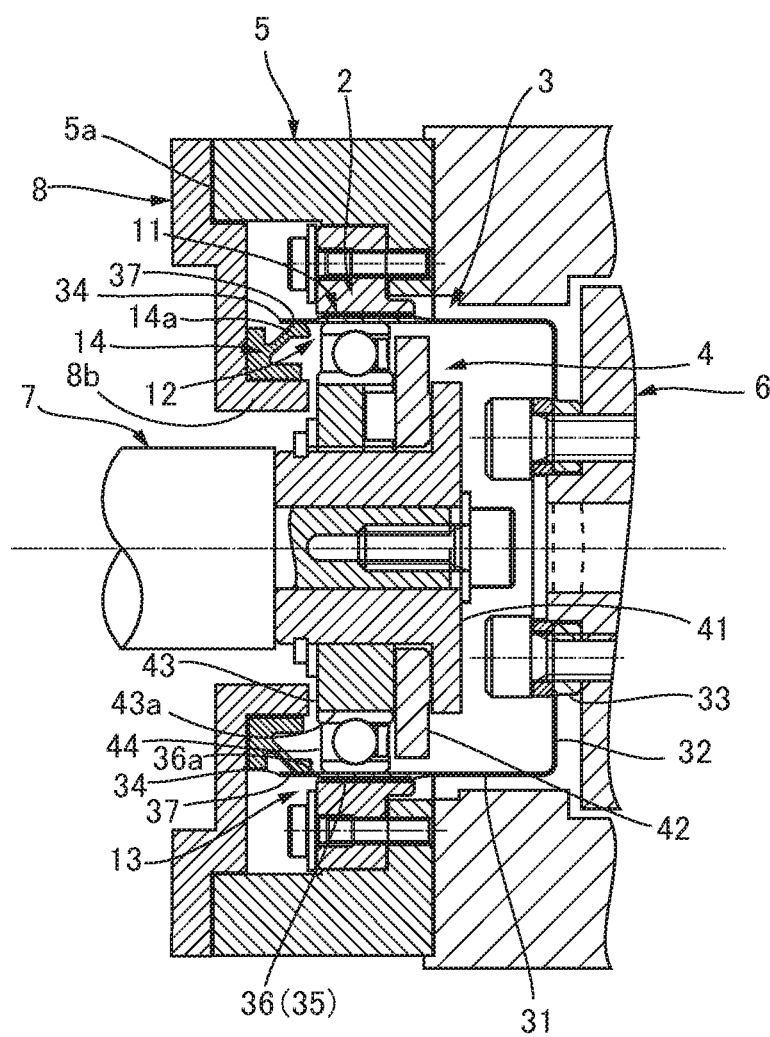
FIG. 2A is a schematic cross-sectional view showing a modification of the lubricant-mixing-prevention part of the strain wave gearing of FIG. 1.

Here, the oil seal can be disposed on the inner-side lubrication portion 12 side. FIG. 2A is a schematic sectional view showing an example of a lubricant-mixing-prevention part having this configuration. An annular oil seal 14 is secured to the external peripheral surface of a cylinder part 8b formed on the internal peripheral edge portion of the partitioning plate 8. A seal lip 14a of the oil seal 14 is in contact with the internal peripheral surface of the cylindrical extension portion 37 of the externally toothed gear 3. In this case as well, the oil seal 14 is provided with deformability capable of following deformation of the cylindrical extension portion 37 of the externally toothed gear 3, and each portion in the circumferential direction is constantly kept in a state of contact with the internal peripheral surface of the cylindrical extension portion 37.

Modification 1-2

Figure 2B:
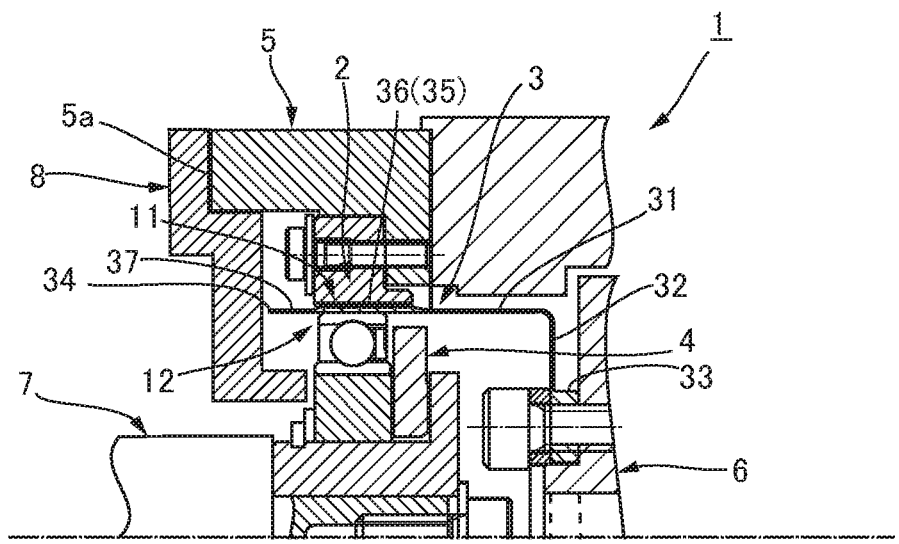
FIG. 2B is a schematic half-sectional view showing a modification of the lubricant-mixing-prevention part of the strain wave gearing of FIG. 1.

There are also cases in which the oil seals 13, 14 can be omitted. For example, when the lubricants are provided with a property that makes mixing with each other difficult, the oil seals can be omitted. FIG. 2B is a schematic half-sectional view of an example of a lubricant-mixing-prevention part in which an oil seal is not used. In this case, the length of the cylindrical extension portion 37 is set, as appropriate, and the gap dimension between the open end 34 and the partitioning plate 8 is set, as appropriate. Mixing of lubricants can thereby be suppressed to a level that does not hinder practical use. Mixing of the two lubricants can be essentially prevented by a very simple lubricant-mixing-prevention part.

Modification 1-3

Figure 2C:
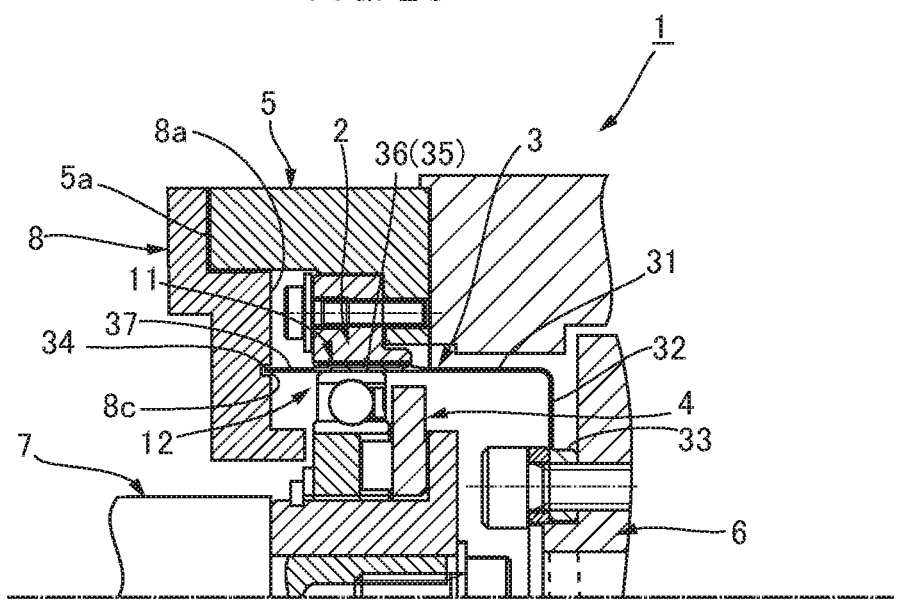
FIG. 2C is a schematic half-sectional view showing a modification of the lubricant-mixing-prevention part of the strain wave gearing of FIG. 1.

FIG. 2C is a schematic half-sectional view showing an example in which a labyrinth seal is used as the lubricant-mixing-prevention part. An annular groove 8c having a rectangular cross section is formed on the facing surface 8a of the partitioning plate 8 that faces the open end 34 of the cylindrical extension portion 37 of the externally toothed gear 3. A state is formed in which a portion of the open end 34 of the cylindrical extension portion 37 is inserted into the groove 8c. The width of the groove 8c is set to a dimension in which there is no interference with the portion of the open end 34 even if the portion deforms. A labyrinth seal is formed between the internal peripheral surface of the groove 8c and the external peripheral surface portion of the portion of the open end 34 of the cylindrical extension portion 37. Mixing of lubricants with each other can be reliably prevented by a lubricant-mixing-prevention part configured from the cylindrical extension portion 37 and a labyrinth seal.

Second Embodiment

Figure 3A:
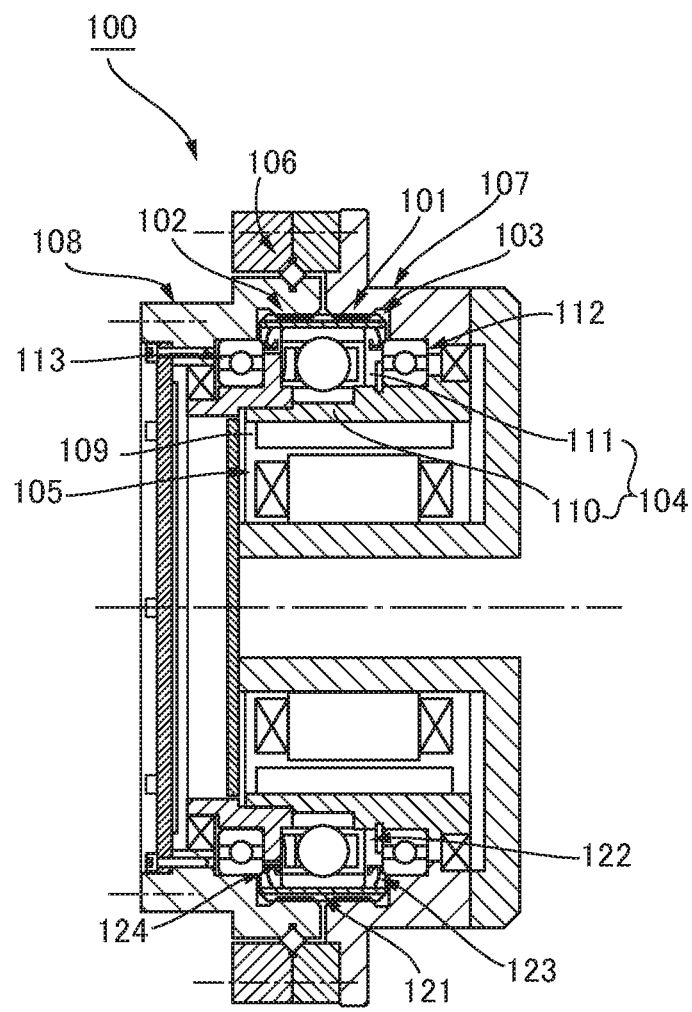
FIG. 3A is a schematic cross-sectional view of a flat-type strain wave gearing according to the second embodiment of the present invention.
Figure 3B:
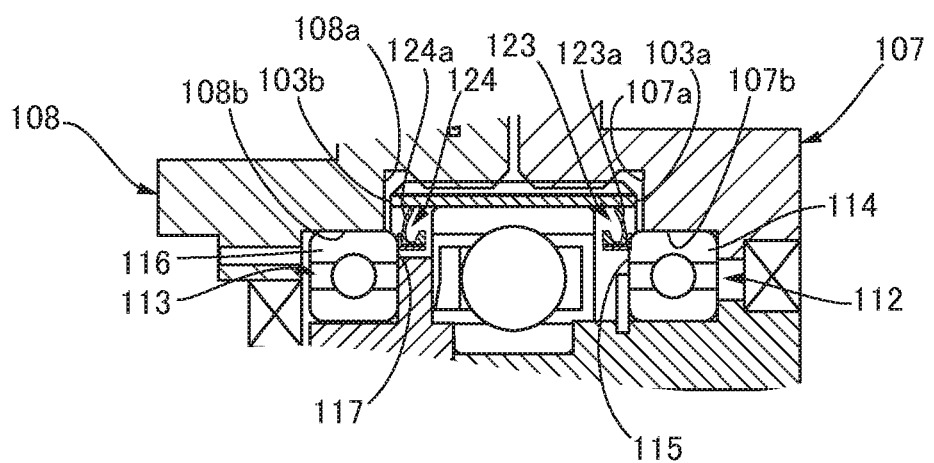
FIG. 3B is an enlarged partial sectional view showing part of the strain wave gearing of FIG. 3A.

FIG. 3A is a schematic cross-sectional view showing the strain wave gearing according to a second embodiment in which the present invention has been applied, and FIG. 3B is an enlarged cross-sectional view showing a portion thereof. The strain wave gearing 100 is a flat-type strain wave gearing, and is provided with rigid first and second internally toothed gears 101 and 102 disposed in parallel, a cylindrically shaped flexible externally toothed gear 103 disposed on the inner side thereof, and a hollow wave generator 104 disposed on the inner side of the externally toothed gear 103. A motor 105 is coaxially accommodated in the hollow part of the wave generator 104.

The first and second internally toothed gears 101, 102 are supported by a cross roller bearing 106 so as to allow rotation relative to each other, and the first internally toothed gear 101 is secured to the device housing 107. An annular output shaft part 108 is integrally formed on the second internally toothed gear 102. The wave generator 104 is provided with a rigid cam plate portion 110 integrally formed on the motor rotor 109, and a wave bearing 111 mounted on an ellipsoidal external peripheral surface of the rigid cam plate portion 110. Ball bearings 112, 113 are disposed on both sides of the wave bearing 111. The motor rotor 109 is supported by the device housing 107 and the output shaft part 108 via the ball bearings 112, 113.

The externally toothed gear 103 is ellipsoidally flexed by the wave generator 104 and meshes with the first and second internally toothed gears 101, 102. When the motor 105 is driven and the motor rotor 109 rotates, the rigid cam plate portion 110, which is integrally formed therewith, also rotates, and the meshing position of the externally toothed gear 103 with the first and second internally toothed gears 101, 102 also moves in the circumferential direction. The second internally toothed gear 102 and the externally toothed gear 103 have the same number of teeth. The number of teeth of the first internally toothed gear 101 on the secured side is two greater than the number of teeth of the gears 102, 103. When the strain wave generator 104 rotates, a relative rotation corresponding to the difference in the number of teeth is generated between the first internally toothed gear 101 and the externally toothed gear 103. This rotation is outputted from the second internally toothed gear 102 via the output shaft part 108.

In the strain wave gearing 100, the tooth meshing portion between the externally toothed gear 103 and the first and second internally toothed gears 101, 102 positioned on the outer side of the externally toothed gear 103 is the outer-side lubrication portion 121 which is lubricated by a lubricant. The sliding portions in the wave generator 104 positioned on the inner side of the externally toothed gear 103, and the contact portion between the wave generator 104 and the externally toothed gear 103, are the inner-side lubrication portion 122 which is lubricated by a lubricant of a type different from the lubricant used in the tooth meshing portion. The strain wave gearing 100 is provided with a lubricant-mixing-prevention part for preventing the lubricant supplied to the outer-side lubrication portion 121 and the lubricant supplied to the inner-side lubrication portion 122 from inter-mixing. In the present example, annular first and second oil seals 123, 124 that seal off the area between the outer-side lubrication portion 121 and the inner-side lubrication portion 122 are disposed as the lubricant-mixing-prevention part.

An end face 107a that faces a first open end 103a, which is one open end of the externally toothed gear 103, is formed on the device housing 107 in which the first internally toothed gear 101 is formed. The internal peripheral edge of the end face 107a is connected to a circular internal peripheral surface 107b, and an outer race 114 of the ball bearing 112 is secured to the circular internal peripheral surface 107b. The first oil seal 123 is secured to an end face 115 of the outer race 114 on the wave generator 104 side. A seal lip 123a of the first oil seal 123 is in contact with the internal peripheral surface portion of the externally toothed gear 103 on the first open end 103a side.

An end face 108a that faces a second open end 103b, which is the other open end of the externally toothed gear 103, is formed on the output shaft part 108 on which the second internally toothed gear 102 is formed. The internal peripheral edge of the end face 108a is connected to a circular internal peripheral surface 108b, and an outer race 116 of the ball bearing 113 is secured to the circular internal peripheral surface 108b. The second oil seal 124 is secured to an end face 117 of the outer race 116 on the wave generator 104 side. A seal lip 124a of the second oil seal 124 is in contact with the internal peripheral surface portion of the externally toothed gear on the second open end 103b side.

Thus, the strain wave gearing 100 is provided with rigid first and second internally toothed gears, a cylindrically shaped flexible externally toothed gear, and a wave generator. The first and second internally toothed gears are disposed in parallel on the outer side of the externally toothed gear, and the wave generator is disposed on the inner side of the externally toothed gear. The strain wave gearing 100 has an inner-side lubrication portion on the inner side of the externally toothed gear, an outer-side lubrication portion on the outer side of the externally toothed gear, and a lubricant-mixing-prevention part for preventing a lubricant for lubricating the inner-side lubrication portion and a lubricant for lubricating the outer-side lubrication portion from inter-mixing. The inner-side lubrication portion includes sliding portions of the wave generator and a contact portion between the wave generator and the internal peripheral surface of the externally toothed gear, and the outer-side lubrication portion is the tooth meshing portion between the externally toothed gear and the first and second internally toothed gears. First and second oil seals, which seal off the area between the inner-side lubrication portion and the outer-side lubrication portion, are provided as the lubricant-mixing-prevention part. The first oil seal is secured to the first internally toothed gear, or is secured to a member which is secured to the first internally toothed gear. The seal lip of the first oil seal is in contact with the internal peripheral surface of the externally toothed gear. The second oil seal is secured to the second internally toothed gear, or is secured to a member which is secured to the second internally toothed gear. The seal lip of the second oil seal is secured to the internal peripheral surface of the externally toothed gear.

The first and second oil seals 123, 124 are provided with a deforming property enabling the deformation of the externally toothed gear 3 to be followed, so that each portion in the circumferential direction is constantly kept in a state of contact with the internal peripheral surface of the externally toothed gear 3. Lubricants can be reliably prevented by the first and second oil seals 123, 124 from mixing together, and both the outer-side lubrication portion 121 and the inner-side lubrication portion 122 can be kept in an appropriately lubricated state.

Modification 2-1

Figure 4A:
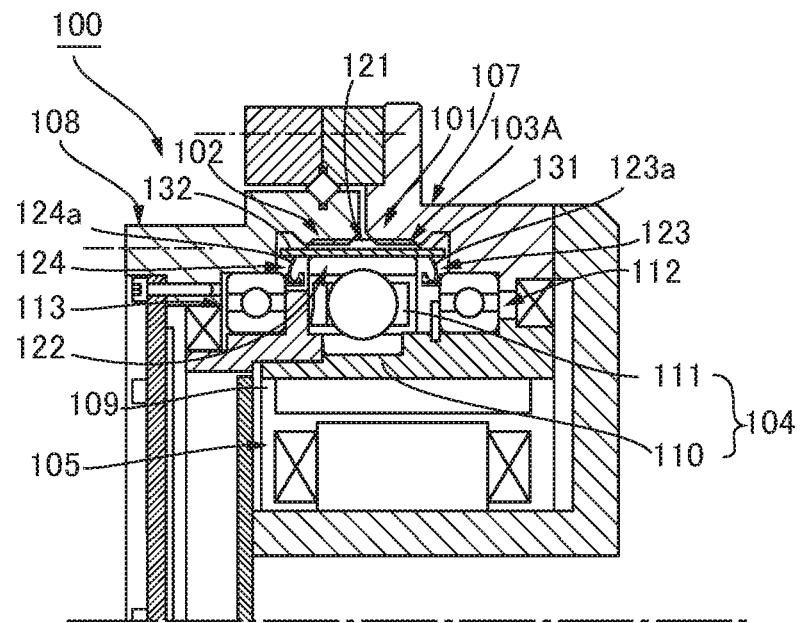
FIG. 4A is a schematic half-sectional view showing a modification of the lubricant-mixing-prevention part of the strain wave gearing of FIG. 3A.

Here, in the case of two types of lubricants that do not easily intermix, the oil seals 123, 124 can be omitted. There are some cases in which the internal peripheral surface portion of the externally toothed gear 103 on both sides of the wave bearing 111 is narrow, and the oil seals 123, 124 cannot be disposed in the externally toothed gear 103. In such cases, as shown in FIG. 4A, on the externally toothed gear 103A there are formed a first cylindrical extension portion 131 and a second cylindrical extension portion 132, which extend a predetermined length without external teeth from the ends, respectively, on both sides of the cylindrical external tooth formation portion in which external teeth are formed. Seal lips 123a, 124a of the first and second oil seals 123, 124 are caused to be in contact with the internal peripheral surfaces of the first and second cylindrical extension portions 131, 132, respectively.

Lubricants can be reliably prevented from inter-mixing by the lubricant-mixing-prevention part provided with the first and second oil seals 123, 124 and the first and second cylindrical extension portions 131, 132, and both the outer-side lubrication portion 121 and the inner-side lubrication portion 122 can be kept in an appropriately lubricated state.

Modification 2-2

Figure 4B:
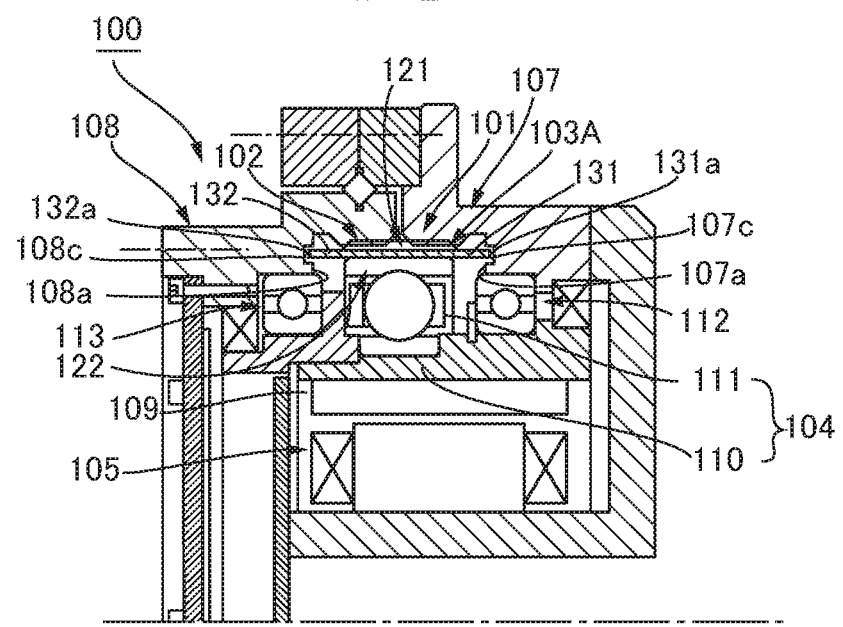
FIG. 4B is a schematic half-sectional view showing a modification of the lubricant-mixing-prevention part of the strain wave gearing of FIG. 3A.

A labyrinth seal can be used in lieu of an oil seal as a lubricant-mixing-prevention structure. As shown in FIG. 4B, in the strain wave gearing 100, the end face 107a of the device housing 107 faces a first open end 131a, which is an open end of the first cylindrical extension portion 131 of the externally toothed gear 103A. An annular groove 107c having a rectangular cross section is formed on the end face 107a. A portion of the first open end 131a of the first cylindrical extension portion 131 is inserted into the groove 107c. The open width of the groove 107c is of such a dimension as to prevent interference with deformation of the first cylindrical extension portion 131. A first labyrinth seal is formed between the groove 107c and a portion of the first open end 131a of the first cylindrical extension portion 131.

Similarly, the end face 108a of the output shaft part 108 faces a second open end 132a, which is an open end of the second cylindrical extension portion 132 of the externally toothed gear 103A. An annular groove 108c having a rectangular cross section is formed on the end face 108a. A state is formed in which a portion of the second open end 132a of the second cylindrical extension portion 132 is inserted into the groove 108c. The open width of the groove 108c is set to a dimension in which there is no interference with deformation of the second cylindrical extension portion 132. A second labyrinth seal is formed between the groove 108c and a portion of the second cylindrical extension portion 132.

Lubricants can be reliably prevented from inter-mixing by a lubricant-mixing-prevention structure provided with first and second labyrinth seals, and both the outer-side lubrication portion 121 and the inner-side lubrication portion 122 can be kept in an appropriately lubricated state.

The invention claimed is:

1. A strain wave comprising:
a rigid internally toothed gear;
a flexible externally toothed gear having a cup shape or top hat shape;
a wave generator;
an inner-side lubrication portion on an inner side of the externally toothed gear;
an outer-side lubrication portion on an outer side of the externally toothed gear; and
a lubricant-mixing-prevention part for preventing a lubricant that lubricates the inner-side lubrication portion and a lubricant that lubricates the outer-ide lubrication portion from inter-mixing,
wherein the externally toothed gear has: a cylinder barrel part; a diaphragm extending radially inward or outward from one end of the cylindrical barrel part; and an open end, which is the other end of the cylindrical barrel part;
the cylindrical barrel part has: an external tooth formation portion on which external teeth are formed; and a cylindrical extension portion between an end of the external tooth formation portion and the opening end;
the internally toothed gear is disposed so as to surround the external tooth formation portion;
the wave generator is disposed on an inner side of the external tooth formation portion, flexing the external tooth formation portion into a non-circular shape to cause the externally toothed gear to partially mesh with internally toothed gear;
the inner-side lubrication portion includes sliding portions in the wave generator and a contact portion between the wave generator and an internal peripheral surface of the externally toothed gear,
the outer-side lubrication portion is a tooth meshing portion between the externally toothed gear and the internally toothed gear, and
the lubrication-mixing-prevention part comprises the cylindrical extension portion,
the strain wave gearing further comprising:
a facing member that faces the open end of the cylindrical extension portion,
wherein the facing member has an annular groove where the open end of the cylindrical extension portion is inserted, and
a labyrinth seal is formed between the cylindrical extension portion and the annular groove.

2. A strain wave gearing which has rigid first and second internally toothed gears, a cylindrically shaped flexible eternally toothed gear, and a wave generator, the first and second internally toothed gear being disposed in parallel on an outer side of the externally toothed gear, the wave generator being disposed on an inner side of the externally toothed gear, the strain wave gearing comprising:
an inner-side lubrication portion on the inner side of the externally toothed gear;
an outer-side lubrication portion on the outer side of the externally toothed gear; and
a lubricant-mixing-prevention part for preventing a lubricant that lubricates the inner-side lubrication portion and a lubricant that lubricates the outer-side lubrication portion from inter-mixing,
wherein the inner-side lubrication portion includes sliding portions in the wave generator and a contact portion between the wave generator and an internal peripheral surface of the externally toothed gear,
the outer-side lubrication portion is a tooth meshing portion between the externally toothed gear and the first and second internally toothed gears,
the externally toothed gear has: a cylindrical external tooth formation portion where external teeth are formed, a first cylindrical extension portion where the external teeth are not formed, and a second cylindrical extension portion where the external teeth are not formed, and a second cylindrical extension portion where the external teeth are not formed, the first and second cylindrical extension portions extending by a prescribed length in a tooth trace direction from both side ends of the external tooth forming portion, and
the strain wave gearing further comprising:
a first facing member that faces a first open end of the first cylindrical extension portion, and
a second facing member that faces a second open end of the second cylindrical extension portion,
wherein the first facing member has a first annular groove where the first open end of the first cylindrical extension portion is inserted,
the second facing member has a second annular groove where the second open end of the second cylindrical extension portion is inserted,
a first labyrinth seal is formed between the first cylindrical extension portion and the first annular groove, and
a second labyrinth seal is formed between the second cylindrical extension portion and the second annular groove.

* * * * *